(12) United States Patent
Nakamura et al.

(10) Patent No.: US 10,337,437 B2
(45) Date of Patent: Jul. 2, 2019

(54) ABNORMALITY DIAGNOSIS DEVICE AND ABNORMALITY DIAGNOSIS METHOD FOR INTERNAL COMBUSTION ENGINE

(71) Applicant: TOYOTA JIDOSHA KABUSHIKI KAISHA, Toyota-shi (JP)

(72) Inventors: Takashi Nakamura, Toyota (JP); Yuki Nose, Kasugai (JP); Eiji Ikuta, Oobu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/901,191

(22) Filed: Feb. 21, 2018

(65) Prior Publication Data

US 2018/0238258 A1 Aug. 23, 2018

(30) Foreign Application Priority Data

Feb. 23, 2017 (JP) ................. 2017-032630

(51) Int. Cl.
| | |
|---|---|
| *F02D 41/22* | (2006.01) |
| *F02D 41/00* | (2006.01) |
| *F02D 41/02* | (2006.01) |
| *F02D 41/14* | (2006.01) |
| *F02D 41/30* | (2006.01) |

(52) U.S. Cl.
CPC .......... *F02D 41/22* (2013.01); *F02D 41/008* (2013.01); *F02D 41/025* (2013.01); *F02D 41/1454* (2013.01); *F02D 41/1495* (2013.01); *F02D 41/3094* (2013.01); *Y02T 10/26* (2013.01)

(58) Field of Classification Search
CPC ...... F02D 41/22; F02D 41/008; F02D 41/025; F02D 41/1454; F02D 41/1495; F02D 41/3094; Y02T 10/26
USPC ......................................................... 60/274
See application file for complete search history.

(56) References Cited

U.S. PATENT DOCUMENTS

2014/0288802 A1   9/2014   Katayama et al.

FOREIGN PATENT DOCUMENTS

| JP | 2012-57492 | 3/2012 |
| JP | 2014-185554 | 10/2014 |

*Primary Examiner* — Audrey K Bradley
*Assistant Examiner* — Kelsey L Stanek
(74) *Attorney, Agent, or Firm* — Oblon, McClelland, Maier & Neustadt, L.L.P.

(57) ABSTRACT

An abnormality diagnosis device for an engine includes an electronic control unit configured to execute temperature rise processing by controlling an air-fuel ratio of at least one of a plurality of cylinders to be a rich air-fuel ratio and controlling an air-fuel ratio of each of the other cylinders to be a lean air-fuel ratio. The electronic control unit is configured to determine whether or not the execution of the temperature rise processing is ongoing, to execute abnormality determination processing to determine whether or not the engine is in an abnormal state, to execute the abnormality determination processing based on whether or not the variation degree during stop of the temperature rise processing exceeds a first determination value, and to execute the abnormality determination processing based on whether or not the variation degree during the execution of the temperature rise processing exceeds a second determination value.

3 Claims, 6 Drawing Sheets

ABNORMALITY DIAGNOSIS DEVICE AND ABNORMALITY DIAGNOSIS METHOD FOR INTERNAL COMBUSTION ENGINE

INCORPORATION BY REFERENCE

The disclosure of Japanese Patent Application No. 2017-032630 filed on Feb. 23, 2017 including the specification, drawings and abstract is incorporated herein by reference in its entirety.

BACKGROUND

1. Technical Field

The disclosure relates to an abnormality diagnosis device and an abnormality diagnosis method for an internal combustion engine.

2. Description of Related Art

Controlling the air-fuel ratio of at least one of a plurality of cylinders of an internal combustion engine to be a rich air-fuel ratio and controlling the air-fuel ratio of each of the other cylinders to be a lean air-fuel ratio is known as temperature rise processing in which the temperature of a catalyst controlling the exhaust gas of the internal combustion engine is raised (refer to, for example, Japanese Unexamined Patent Application Publication No. 2012-057492 (JP 2012-057492 A)).

SUMMARY

An abnormality diagnosis device is known with regard to the internal combustion engine described above. The abnormality diagnosis device calculates a variation degree of the air-fuel ratios of the cylinders and determines whether or not the internal combustion engine is abnormal based on the variation degree. During the execution of the temperature rise processing described above, the inter-cylinder air-fuel ratio variation is intentionally controlled to increase. Accordingly, once whether or not the internal combustion engine is abnormal is determined based on the variation degree of the air-fuel ratios during the execution of the temperature rise processing, an erroneous determination that the internal combustion engine is abnormal may be made based on a large variation degree of the air-fuel ratios during the execution of the temperature rise processing regardless of the internal combustion engine being normal. The erroneous determination may result in a decline in the accuracy of the abnormality determination.

The disclosure provides an abnormality diagnosis device and an abnormality diagnosis method for an internal combustion engine in which a decline in the accuracy of an abnormality determination for the internal combustion engine is further suppressed.

A first aspect of the disclosure relates to an abnormality diagnosis device for an internal combustion engine having a plurality of cylinders. The abnormality diagnosis device includes an electronic control unit configured to execute temperature rise processing in which a temperature of a catalyst controlling exhaust gas from the cylinders is raised by controlling an air-fuel ratio of at least one of the cylinders to be a rich air-fuel ratio lower than a stoichiometric air-fuel ratio and controlling an air-fuel ratio of each of the other cylinders to be a lean air-fuel ratio higher than the stoichiometric air-fuel ratio. The electronic control unit is configured to determine whether or not the execution of the temperature rise processing is ongoing. The electronic control unit is configured to execute abnormality determination processing to determine whether or not the internal combustion engine is in an abnormal state based on a variation degree of the air-fuel ratios of the cylinders. The electronic control unit is configured to execute the abnormality determination processing based on whether or not the variation degree during stop of the temperature rise processing exceeds a first determination value. The electronic control unit is configured to execute the abnormality determination processing based on whether or not the variation degree during the execution of the temperature rise processing exceeds a second determination value. The second determination value is larger than the first determination value.

The electronic control unit determines whether or not the internal combustion engine is abnormal based on whether or not the variation degree during the execution of the temperature rise processing in which an air-fuel ratio variation is intentionally generated exceeds the second determination value exceeding the first determination value, and thus an erroneous determination that the internal combustion engine is abnormal despite the internal combustion engine being normal is further suppressed. As a result, a decline in the accuracy of the abnormality determination for the internal combustion engine is further suppressed.

In the abnormality diagnosis device according to the first aspect of the disclosure, the electronic control unit may be configured to execute the temperature rise processing by switching the single cylinder controlled to have the rich air-fuel ratio sequentially by controlling one of the cylinders to have the rich air-fuel ratio and controlling the air-fuel ratio of each of the other cylinders to be the lean air-fuel ratio. The electronic control unit may be configured to execute the abnormality determination processing by using any one of the maximum value among the respective variation degrees of combinations of the cylinders respectively controlled to have the rich air-fuel ratio and the lean air-fuel ratio during the temperature rise processing, an average value of the respective variation degrees of the combinations, and a total value of the respective variation degrees of the combinations as the variation degree during the execution of the temperature rise processing.

A second aspect of the disclosure relates to an abnormality diagnosis method for an internal combustion engine having a plurality of cylinders. The internal combustion engine is configured to be controlled by an electronic control unit. The abnormality diagnosis method includes: executing, by the electronic control unit, temperature rise processing in which a temperature of a catalyst controlling exhaust gas from the cylinders is raised by an air-fuel ratio of at least one of the cylinders being controlled to be a rich air-fuel ratio lower than a stoichiometric air-fuel ratio and an air-fuel ratio of each of the other cylinders being controlled to be a lean air-fuel ratio higher than the stoichiometric air-fuel ratio; determining, by the electronic control unit, whether or not the execution of the temperature rise processing is ongoing; executing, by the electronic control unit, abnormality determination processing to determine whether or not the internal combustion engine is abnormal based on a variation degree of the air-fuel ratios of the cylinders; executing, by the electronic control unit, the abnormality determination processing based on whether or not the variation degree during stop of the temperature rise processing exceeds a first determination value; and executing, by the electronic control unit, the abnormality determination processing based on whether or not the variation degree during the execution of the temperature rise processing exceeds a second determination value. The second determination value is larger than the first determination value.

According to the first and second aspects of the disclosure, an abnormality diagnosis device and an abnormality diagnosis method for an internal combustion engine in which a decline in the accuracy of an abnormality determination for the internal combustion engine is further suppressed can be provided.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
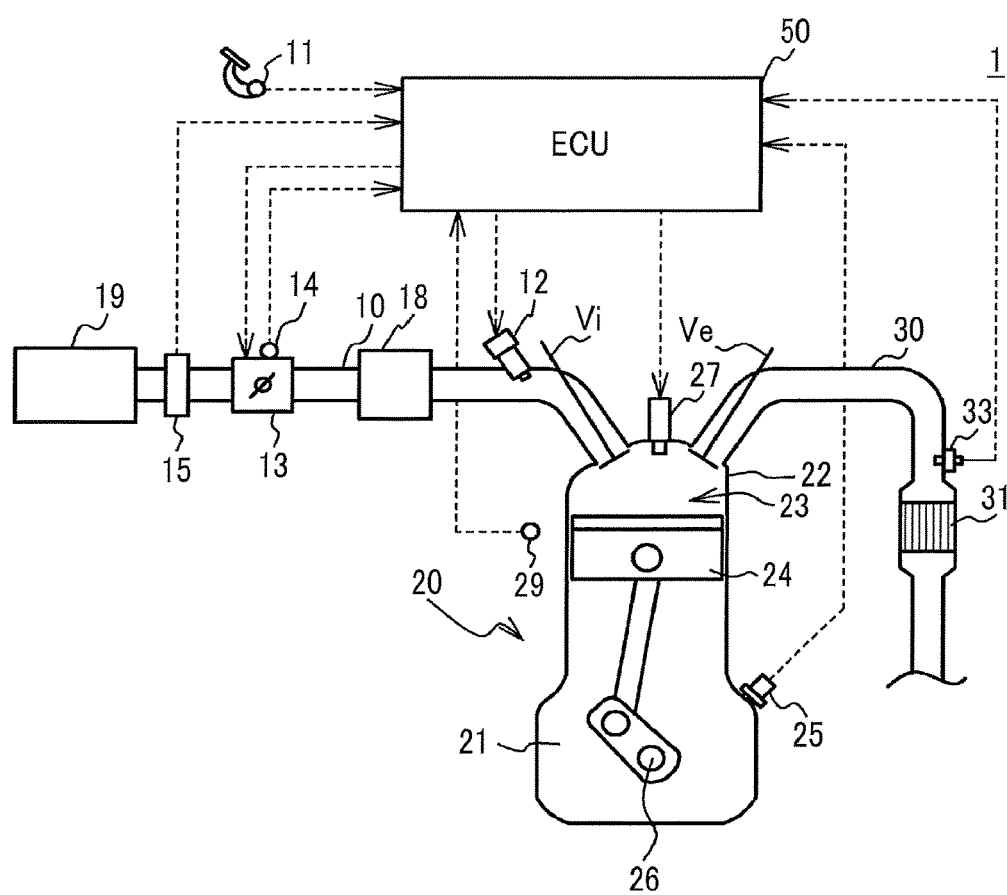
FIG. 1 is a schematic configuration diagram of an engine system.

FIG. 1 is a schematic configuration diagram of an engine system 1. In an engine 20, a piston 24 reciprocates as an air-fuel mixture is combusted in a combustion chamber 23 inside a cylinder head 22 installed in the upper portion of a cylinder block 21 storing the piston 24. The reciprocation of the piston 24 is converted into the rotational motion of a crankshaft 26. The engine 20 is an in-line four-cylinder engine. However, the engine 20 is not limited thereto insofar as it has a plurality of cylinders.

An intake valve Vi opening and closing an intake port and an exhaust valve Ve opening and closing an exhaust port are disposed for each cylinder in the cylinder head 22 of the engine 20. An ignition plug 27 for igniting the air-fuel mixture in the combustion chamber 23 is attached for each cylinder to the top portion of the cylinder head 22.

The intake port of each cylinder is connected to a surge tank 18 via a branch pipe for each cylinder. An intake pipe 10 is connected to the upstream side of the surge tank 18. An air cleaner 19 is disposed at the upstream end of the intake pipe 10. On the intake pipe 10, an air flow meter 15 for intake air amount detection and an electronically controlled throttle valve 13 are disposed sequentially from the upstream side of the intake pipe 10.

A fuel injection valve 12 for fuel injection into the intake port is installed at the intake port of each cylinder. The fuel that is injected from the fuel injection valve 12 forms the air-fuel mixture by being mixed with intake air. The air-fuel mixture is suctioned into the combustion chamber 23 when the intake valve Vi is opened. Then, the air-fuel mixture is compressed by the piston 24, ignited by the ignition plug 27, and combusted. A fuel injection valve directly injecting a fuel into a cylinder may be disposed in place of the fuel injection valve 12 that injects the fuel into the intake port. Alternatively, both a fuel injection valve that injects a fuel into a cylinder and the fuel injection valve that injects the fuel into the intake port may be provided at the same time.

The exhaust port of each cylinder is connected to an exhaust pipe 30 via a branch pipe for each cylinder. A three-way catalyst 31 is disposed on the exhaust pipe 30. The three-way catalyst 31 has an oxygen storage capacity and removes NOx, HC, and CO. In the three-way catalyst 31, one or a plurality of catalyst layers including a catalyst carrier such as an aluminum oxide ($Al_2O_3$) and a catalyst metal carried on the catalyst carrier such as platinum (Pt), palladium (Pd), and rhodium (Rh) is formed on a base material such as cordierite, a honeycomb substrate in particular. The three-way catalyst 31 is an example of a catalyst controlling the exhaust gas that is discharged from the cylinders of the engine 20. The three-way catalyst 31 may be an oxidation catalyst or a gasoline particulate filter coated with an oxidation catalyst.

An air-fuel ratio sensor 33 for detecting the air-fuel ratio of the exhaust gas is installed on the upstream side of the three-way catalyst 31. The air-fuel ratio sensor 33 is a so-called wide-area air-fuel ratio sensor capable of continuously detecting an air-fuel ratio over a relatively wide range. The air-fuel ratio sensor 33 outputs a signal of a value proportional to the air-fuel ratio.

The engine system 1 is provided with an electronic control unit (ECU) 50. The ECU 50 is provided with a central processing unit (CPU), a random access memory (RAM), a read-only memory (ROM), a storage device, and so on. The ECU 50 controls the engine 20 by executing a program stored in the ROM or the storage device. The ECU 50 is an abnormality diagnosis device diagnosing an abnormality of the engine 20 and executes abnormality diagnosis control (described later). The abnormality diagnosis control is functionally realized by the CPU, the ROM, and the RAM. Details thereof will be described later.

The ignition plug 27, the throttle valve 13, the fuel injection valve 12, and so on are electrically connected to the ECU 50. In addition, an accelerator operation amount sensor 11 for accelerator operation amount detection, a throttle opening degree sensor 14 detecting the throttle opening degree of the throttle valve 13, the air flow meter 15 for intake air amount detection, the air-fuel ratio sensor 33, a crank angle sensor 25 detecting the crank angle of the crankshaft 26, a coolant temperature sensor 29 detecting the temperature of a coolant for the engine 20, and various other sensors are electrically connected to the ECU 50 via an A/D converter (not illustrated) and so on. The ECU 50 performs ignition timing control, fuel injection amount control, fuel injection ratio control, fuel injection timing control, throttle opening degree control, and so on and controls the ignition plug 27, the throttle valve 13, the fuel injection valve 12, and so on based on the values that are detected by the various sensors and the like so that a desired output is obtained.

Target air-fuel ratio setting by the ECU 50 will be described below. A target air-fuel ratio is set in accordance with the operation state of the engine 20 during stop of temperature rise processing (described later). In some cases, for example, a stoichiometric air-fuel ratio is set as the target air-fuel ratio when the operation state of the engine 20 is in a low-rotation and low-load region and an air-fuel ratio closer to the rich side than the stoichiometric air-fuel ratio is set as the target air-fuel ratio when the operation state of the engine 20 is in a high-rotation and high-load region. Once the target air-fuel ratio is set, feedback control is performed on the fuel injection amount into each cylinder such that the air-fuel ratio that is detected by the air-fuel ratio sensor 33 corresponds to the target air-fuel ratio.

The ECU 50 executes the temperature rise processing for the temperature of the three-way catalyst 31 to rise up to a predetermined temperature range. During the temperature rise processing, so-called dither control is executed in which the air-fuel ratio of at least one of the cylinders is controlled to be a rich air-fuel ratio lower than the stoichiometric air-fuel ratio and the air-fuel ratio of each of the other cylinders is controlled to be a lean air-fuel ratio higher than the stoichiometric air-fuel ratio. Specifically, in the air-fuel ratio control during the temperature rise processing, the air-fuel ratio in one cylinder is adjusted to the rich air-fuel ratio by correcting the fuel injection amount such that the fuel injection amount is increased by a predetermined rate (percentage) with respect to the fuel injection amount corresponding to the target air-fuel ratio, whereas the air-fuel ratio of in each of the remaining cylinders is adjusted to the lean air-fuel ratio by correcting the fuel injection amount such that the fuel injection amount is decreased by a predetermined rate (percentage) with respect to the fuel injection amount corresponding to the target air-fuel ratio. For example, the air-fuel ratio in one cylinder is adjusted to the rich air-fuel ratio by correcting the fuel injection amount such that the fuel injection amount is increased by 15% with respect to the fuel injection amount corresponding to the target air-fuel ratio, whereas the air-fuel ratio in each of the remaining three cylinders is adjusted to the lean air-fuel ratio by correcting the fuel injection amount such that the fuel injection amount is decreased by 5% with respect to the fuel injection amount corresponding to the target air-fuel ratio. Once the temperature rise processing is executed as described above, the surplus fuel that is discharged from the cylinder set to have the rich air-fuel ratio adheres to the three-way catalyst 31 and is combusted under a lean atmosphere by the exhaust gas discharged from the cylinder set to have the lean air-fuel ratio. The temperature of the three-way catalyst 31 is raised as a result. In the present example, among the #1 to #4 cylinders, the #1 cylinder is controlled to be a rich cylinder that has the rich air-fuel ratio and each of the #2 to #4 cylinders is controlled to be a lean cylinder that has the lean air-fuel ratio.

During the temperature rise processing, the average of the air-fuel ratios of all of the cylinders is set to be the stoichiometric air-fuel ratio. However, the average does not necessarily have to be the stoichiometric air-fuel ratio and the average may also be an air-fuel ratio within a predetermined range including the stoichiometric air-fuel ratio at which the temperature of the three-way catalyst 31 is capable of rising up to an activation temperature and a regeneration temperature. For example, the rich air-fuel ratio is set to a value ranging from 9 to 12 and the lean air-fuel ratio is set to a value ranging from 15 to 16. At least one of the cylinders may be set to have the rich air-fuel ratio with the other cylinders set to have the lean air-fuel ratio.

The ECU 50 determines whether or not the engine 20 is in an abnormal state in accordance with the degree of the inter-cylinder air-fuel ratio variation (hereinafter, simply referred to as the variation degree). The variation degree is calculated as follows, for example. The ECU 50 acquires the maximum value of the amount of change within a predetermined period in the detection value of the air-fuel ratio sensor 33 in each cycle of the engine 20 over predetermined cycles and calculates the average value of the maximum values in the respective cycles described above as the variation degree. This is because the degree of the inter-cylinder air-fuel ratio variation also increases as the cylinders have an increasing amount of change in the air-fuel ratio of the exhaust gas. Accordingly, the ECU 50 determines that the engine 20 is in an abnormal state in a case where the variation degree exceeds a predetermined abnormality determination value during abnormality determination processing (described later).

The ECU 50 may also acquire the maximum value of the amount of change within a predetermined period in the angular velocity of crankshaft 26 in one cycle of the engine 20 over a predetermined cycle and calculate the average value or the total value of the maximum values in the respective cycles described above as the variation degree. This is because the degree of the inter-cylinder output torque variation also increases and the degree of the inter-cylinder air-fuel ratio variation also increases as the cylinders have an increasing amount of change in the angular velocity of the crankshaft 26.

Figure 2:
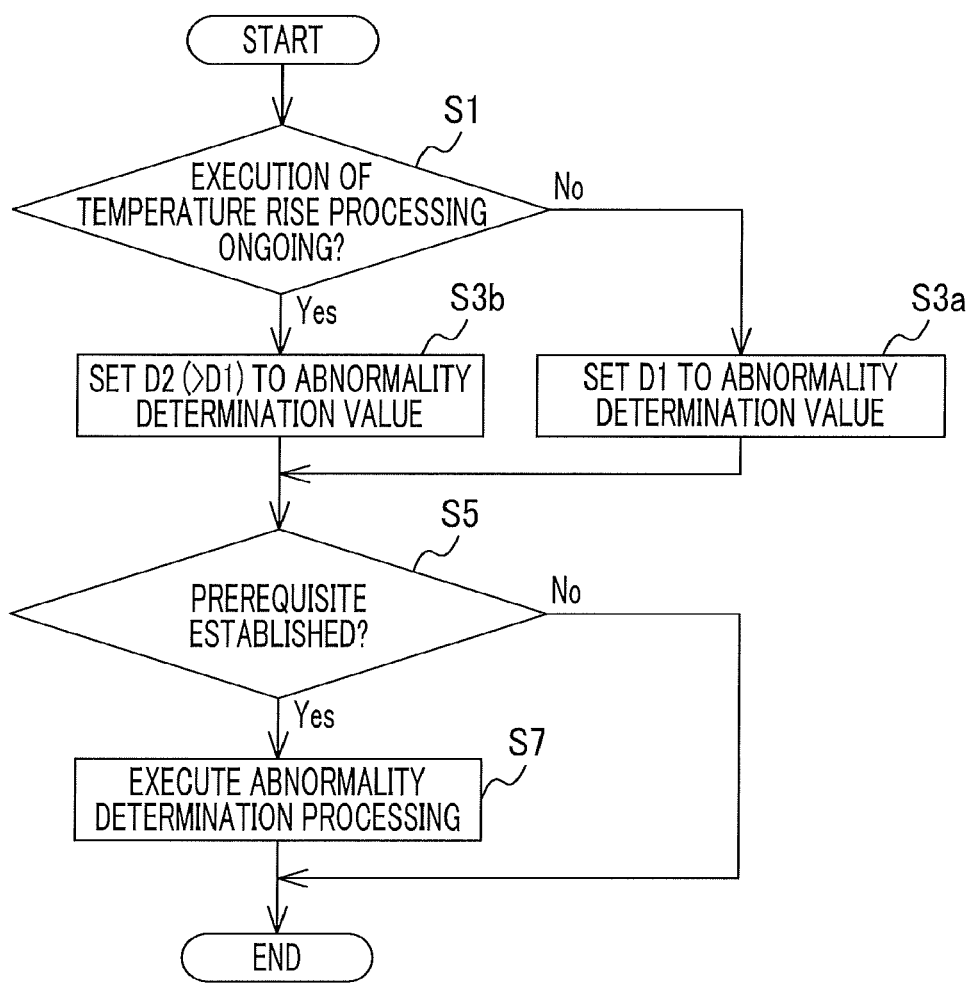
FIG. 2 is a flowchart illustrating an example of abnormality diagnosis control executed by an ECU.

FIG. 2 is a flowchart illustrating an example of the abnormality diagnosis control that is executed by the ECU 50. The abnormality diagnosis control is repeatedly executed at predetermined cycles. Firstly, the ECU 50 determines whether or not the execution of the temperature rise processing is ongoing (Step S1). Specifically, the ECU 50 determines whether or not the execution of the temperature rise processing is ongoing by referring to a temperature rise processing execution flag. A case where the temperature rise processing execution flag is ON means that the execution of the temperature rise processing is ongoing and a case where the temperature rise processing execution flag is OFF means that the execution of the temperature rise processing is not ongoing. The determination of Step S1 is not limited to the method described above. For example, the determination of Step S1 may also be made based on a parameter value that depends on whether or not the execution of the temperature rise processing is ongoing. In a case where the valve opening and closing timing is set to the most advanced angle merely during the execution of the temperature rise processing, for example, the ECU 50 may make the determination of Step S1 by referring to the advance angle amount at the valve opening and closing timing. The processing of Step S1 is an example of the processing that is executed by the electronic control unit determining whether or not the execution of the temperature rise processing for raising the temperature of the three-way catalyst 31 controlling the exhaust gas from the #1 to #4 cylinders by controlling the air-fuel ratio of at least one of the #1 to #4 cylinders of the engine 20 to be the rich air-fuel ratio lower than the stoichiometric air-fuel ratio and controlling the air-fuel ratio of each of the other cylinders to be the lean air-fuel ratio higher than the stoichiometric air-fuel ratio is ongoing.

In the case of a negative determination in Step S1, a first determination value D1 (hereinafter, simply referred to as a determination value D1) is set as the abnormality determination value (Step S3a). In the case of a positive determination in Step S1, a second determination value D2 (hereinafter, simply referred to as a determination value D2) is set as the abnormality determination value (Step S3b). The determination value D2 is set to a value that exceeds the determination value D1.

The ECU 50 determines whether or not an abnormality determination prerequisite is established (Step S5). Specifically, the ECU 50 determines whether or not the abnormality determination prerequisite is established based on whether or not a prerequisite establishment flag is ON. The prerequisite establishment flag is switched from OFF to ON in a case where, for example, the non-execution of the abnormality determination processing during the same trip, the completion of warm-up of the engine 20, the operation state of the engine 20 not being a transient operation state such as rapid acceleration and rapid deceleration, the throttle opening degree and the rotation speed of the engine 20 being within predetermined regions, the execution of air-fuel ratio feedback control based on the detection value of the air-fuel ratio sensor 33 being ongoing, and the execution of fuel cut not being ongoing are satisfied without exception. The ECU 50 determines whether or not each of the conditions is established based on an abnormality determination processing completion flag indicating the completion of the abnormality determination processing during the same trip being OFF and the detection values of the various sensors such as the coolant temperature sensor 29, the crank angle sensor 25, the throttle opening degree sensor 14, and the accelerator operation amount sensor 11. This control is terminated in the case of a negative determination in Step S5.

In the case of a positive determination in Step S5, the ECU 50 executes the abnormality determination processing to determine whether or not the variation degree exceeds the abnormality determination value (Step S7). Accordingly, the ECU 50 determines whether or not the variation degree exceeds the determination value D1 during stop of the temperature rise processing and determines whether or not the variation degree exceeds the determination value D2 during the execution of the temperature rise processing. During the abnormality determination processing, the ECU 50 determines that the engine 20 is in the abnormal state in a case where the variation degree exceeds the determination value compared to the variation degree and determines that the engine 20 is normal in a case where the variation degree does not exceed the determination value compared to the variation degree. The ECU 50 determines whether or not the engine 20 is in the abnormal state based on whether or not the variation degree during the execution of the temperature rise processing exceeds the determination value D2 as described above, and thus a decline in the accuracy of the abnormality determination during the execution of the temperature rise processing is further suppressed. The processing of Step S7 is an example of the processing that is executed by the electronic control unit executing the abnormality determination processing to determine whether or not the engine 20 is in the abnormal state based on the degree of the air-fuel ratio variation of the #1 to #4 cylinders.

Figure 3:
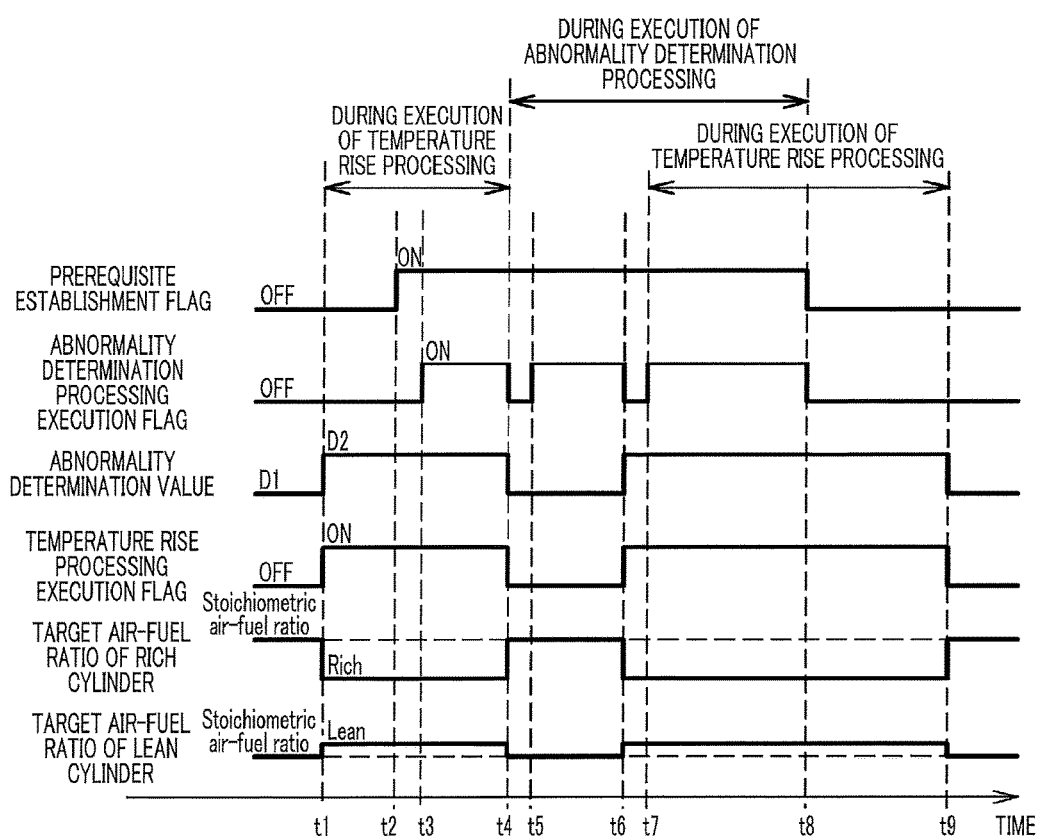
FIG. 3 is an example of a timing chart illustrating an example of the abnormality diagnosis control.

FIG. 3 is an example of a timing chart illustrating an example of the abnormality diagnosis control. The prerequisite establishment flag, an abnormality determination processing execution flag, the abnormality determination value, the temperature rise processing execution flag, and the target air-fuel ratios of the rich cylinder and the lean cylinder by the temperature rise processing are illustrated in FIG. 3. Once the temperature rise processing execution flag is switched from OFF to ON at time t1, the temperature rise processing is executed. Then, in the present example, the #1 cylinder is controlled to be the rich cylinder, the #2 to #4 cylinders are controlled to be the lean cylinders, and the abnormality determination value is set to the determination value D2 from the determination value D1. Once the prerequisite establishment flag is switched from OFF to ON during the execution of the temperature rise processing at time t2, the abnormality determination processing execution flag is subsequently switched from OFF to ON at time t3, and then the abnormality determination processing is executed based on the determination value D2. The abnormality determination processing is initiated after the elapse of a predetermined period from the switching of the prerequisite establishment flag to ON as described above because the operation state of the engine 20 may not be stable even immediately after the switching of the prerequisite establishment flag to ON and a decline in the accuracy of the abnormality determination is further suppressed by the abnormality determination processing being initiated after the operation state of the engine 20 is stabilized. From the viewpoint of ensuring an abnormality determination processing execution period, the abnormality determination processing may also be executed immediately after the switching of the prerequisite establishment flag to ON.

Once the temperature rise processing execution flag is switched to OFF and the temperature rise processing is stopped at time t4, the abnormality determination value is set back to the determination value D1, the abnormality determination processing execution flag is switched to OFF, and the abnormality determination processing is temporarily stopped. Subsequently, at time t5, the abnormality determination processing execution flag is switched back to ON in a state where the temperature rise processing execution flag is OFF and the abnormality determination processing is resumed based on the determination value D1 during the stop of the temperature rise processing. The abnormality determination processing is resumed after the elapse of a predetermined period from the stop of the temperature rise processing as described above because the operation state of the engine 20 may not be stable immediately after the stop of the temperature rise processing and a decline in the accuracy of the abnormality determination is further suppressed by the abnormality determination processing being resumed after the operation state of the engine 20 is stabilized. From the viewpoint of ensuring the abnormality determination processing execution period, the abnormality determination processing may continue to be performed as it is, even when the temperature rise processing is stopped, insofar as the prerequisite establishment flag is ON.

Once the temperature rise processing execution flag is switched to ON at time t6, the temperature rise processing is initiated, the abnormality determination value is set back to the determination value D2, the abnormality determination processing execution flag is switched to OFF, and the abnormality determination processing is temporarily stopped. Subsequently, at time t7, the abnormality determination processing execution flag is switched back to ON in a state where the temperature rise processing execution flag is ON and the abnormality determination processing is resumed based on the determination value D2 during the execution of the temperature rise processing. The abnormality determination processing is resumed after the elapse of a predetermined period from the execution of the temperature rise processing as described above because a decline in the accuracy of the abnormality determination is further suppressed by the abnormality determination processing being resumed after the operation state of the engine 20 is stabilized as described above. In this case as well, from the viewpoint of ensuring the abnormality determination processing execution period, the abnormality determination processing may continue to be performed as it is, even when the temperature rise processing is executed, insofar as the prerequisite establishment flag is ON.

Once the prerequisite establishment flag is switched to OFF at time t8, the abnormality determination processing execution flag is switched to OFF and the abnormality determination processing is stopped. The abnormality determination value is set to the determination value D1 once the temperature rise processing execution flag is switched to OFF and the temperature rise processing is stopped at time t9 in a state where the prerequisite establishment flag is OFF.

In the example described above, the average value of the maximum values of the variation degrees in the respective cycles is used as the variation degree that is used in the abnormality determination processing. However, the disclosure is not limited thereto and the total value of the maximum values in the respective cycles may replace the average value. This is because the total value indicates that the variation degree increases as the above-described total value increases. In a case where the total value of the maximum values of the variation degrees in the respective cycles is used as the variation degree in the abnormality determination processing, values larger than in a case where the average value of the maximum values is used as the variation degree in the abnormality determination processing need to be adopted as the determination values D1, D2.

Although the determination value D2 may be a constant value, the disclosure is not limited thereto. The determination value D2 may also be set to increase as the increase/decrease ratio of the fuel injection amount in the temperature rise processing increases, that is, as the difference between the rich air-fuel ratio and the lean air-fuel ratio in the temperature rise processing increases. This is because the variation degree increases as the difference increases.

Figure 4:
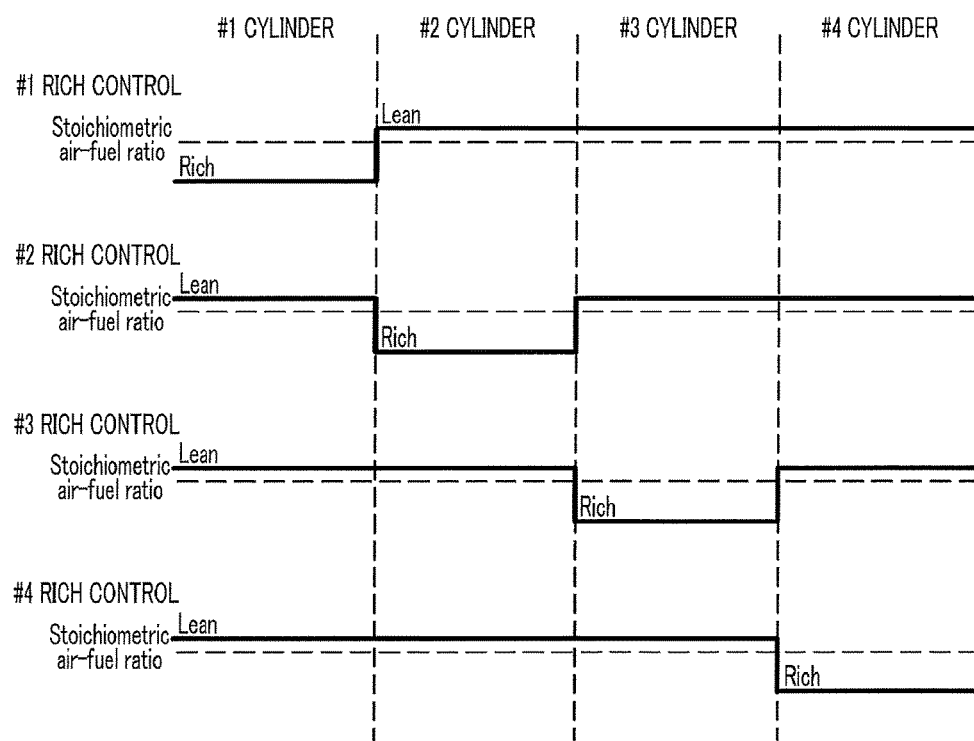
FIG. 4 is an explanatory diagram of temperature rise processing according to a modification example.

A modification example of the abnormality diagnosis control will be described below. In the modification example, merely one cylinder is controlled to have the rich air-fuel ratio, the air-fuel ratios of the other cylinders are controlled to be the lean air-fuel ratio, and the single cylinder controlled to have the rich air-fuel ratio is switched sequentially in the temperature rise processing. FIG. 4 is an explanatory diagram illustrating the air-fuel ratio of each cylinder in the temperature rise processing in which the rich cylinder is switched. The first from the top of FIG. 4 shows the air-fuel ratio of each cylinder in a state where the #1 cylinder is controlled to be the rich cylinder and the cylinders other than the #1 cylinder are controlled to be the lean cylinders (hereinafter, referred to as #1 rich control). The second from the top of FIG. 4 shows the air-fuel ratio of each cylinder in a state where the #2 cylinder is controlled to be the rich cylinder and the cylinders other than the #2 cylinder are controlled to be the lean cylinders (hereinafter, referred to as #2 rich control). The third from the top of FIG. 4 shows the air-fuel ratio of each cylinder in a state where the #3 cylinder is controlled to be the rich cylinder and the cylinders other than the #3 cylinder are controlled to be the lean cylinders (hereinafter, referred to as #3 rich control). The fourth from the top of FIG. 4 shows the air-fuel ratio of each cylinder in a state where the #4 cylinder is controlled to be the rich cylinder and the cylinders other than the #4 cylinder are controlled to be the lean cylinders (hereinafter, referred to as #4 rich control). The temperature rise processing is executed with the combination of the rich cylinder and the lean cylinders switched sequentially every predetermined number of cycles as described above.

The ECU 50 calculates the variation degree in each combination. The calculation of the variation degree is as in the case of the example described above. The ECU 50 acquires the maximum value of the amount of change within a predetermined period in the detection value of the air-fuel ratio sensor 33 in one cycle over a predetermined cycle for each of the #1 to #4 rich control and calculates the average value of the maximum values in the respective cycles described above as the variation degree in each of the #1 to #4 rich control. Specifically, when it comes to the variation degree in the #1 rich control, the ECU 50 acquires the maximum value of the amount of change within a predetermined period in the detection value of the air-fuel ratio sensor 33 in one cycle during the #1 rich control over a predetermined cycle and calculates the average value of the maximum values in the respective cycles described above as the variation degree in the #1 rich control. The same applies to the calculation of the variation degree in each of the #2 to #4 rich control.

Figure 5:
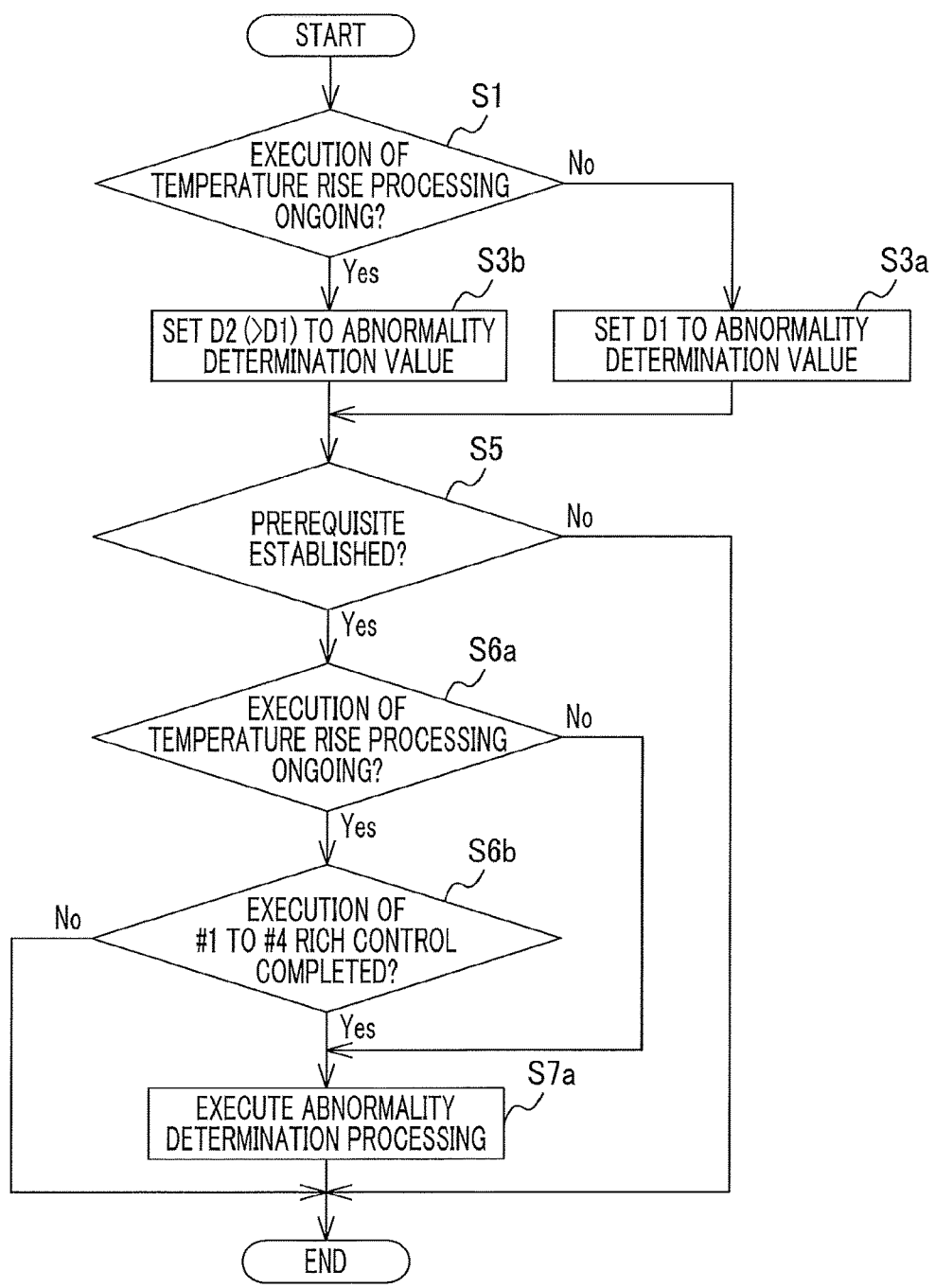
FIG. 5 is a flowchart illustrating an example of the abnormality diagnosis control according to the modification example.

FIG. 5 is a flowchart illustrating the modification example of the abnormality diagnosis control. The same reference numerals will be used to refer to the same processing as in the example described above, and description of the duplicate processing will be omitted. In the present modification example, the ECU 50 determines again whether or not the execution of the temperature rise processing is ongoing (Step S6a) in a case where a positive determination is made in Step S5 after the execution of Step S1, S3a, or S3b. In the case of a negative determination, the abnormality determination processing is executed based on the determination value D1 (Step S7a) as in the example described above.

In the case of a positive determination in Step S6a, the ECU 50 determines whether or not the execution of the #1 to #4 rich control in the temperature rise processing is completed without exception (Step S6b). In the case of a negative determination, this control is terminated without the abnormality determination processing being executed. In the case of a positive determination, the abnormality determination processing is executed based on whether or not the maximum value among the respective variation degrees in the #1 to #4 rich control exceeds the determination value D2. The abnormality determination processing is executed by the use of the maximum value among the respective variation degrees in the #1 to #4 rich control as described above for the following reason.

Figure 6:
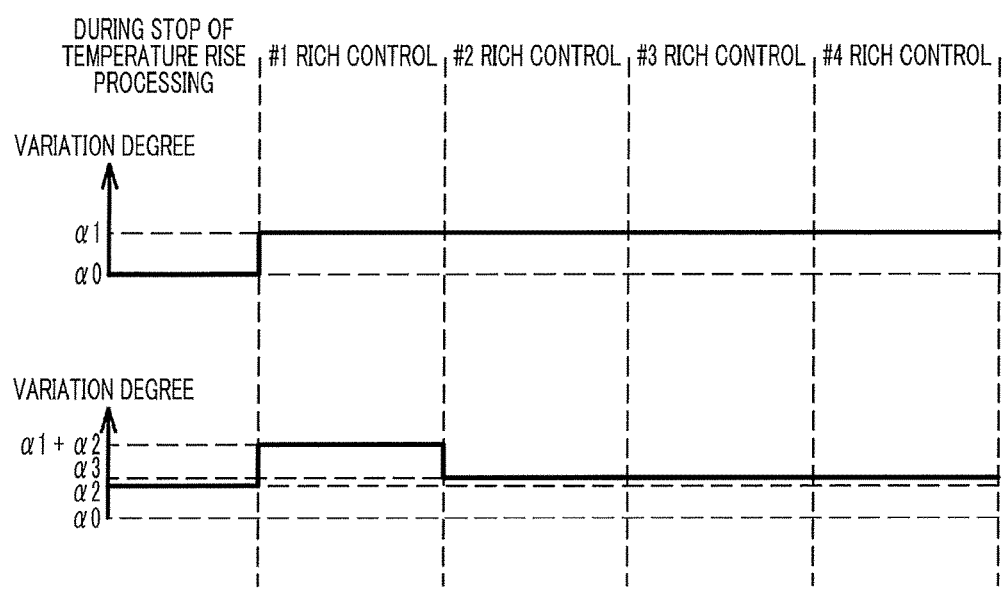
FIG. 6 is a graph illustrating a variation degree during stop of the temperature rise processing and each variation degree in #1 to #4 rich control.

FIG. 6 is a graph illustrating the variation degree during the stop of the temperature rise processing and each variation degree in the #1 to #4 rich control. The upper part of FIG. 6 shows the variation degree in an ideal state of the engine 20 where the inter-cylinder variation degree is minimal. Once the variation degree during the stop of the temperature rise processing becomes $\alpha 0$, the variation degree increases to $\alpha 1$ as a result of the execution of the temperature rise processing. Since the engine 20 is in the ideal state where the inter-cylinder variation degree is minimal, each variation degree in the #1 to #4 rich control is calculated as almost the same $\alpha 1$ no matter which cylinder is controlled to be the rich cylinder.

The lower part of FIG. 6, in contrast, shows the variation degree in a state of the engine 20 where the air-fuel ratio of the #1 cylinder unintentionally becomes the rich air-fuel ratio even during the stop of the temperature rise processing, which is an example of an abnormality of the #1 cylinder. In this case, the fuel injection amount is adjusted such that the average air-fuel ratio in one cycle becomes the stoichiometric air-fuel ratio and each of the air-fuel ratios of the #2 to #4 cylinders becomes almost the same lean air-fuel ratio. Accordingly, the difference between the stoichiometric air-fuel ratio and the lean air-fuel ratio of each of the #2 to #4 cylinders becomes approximately one-third of the difference between the stoichiometric air-fuel ratio and the rich air-fuel ratio of the #1 cylinder.

In a case where the variation degree attributable to the #1 cylinder is $\alpha 2$ during the stop of the temperature rise processing, the variation degree in the #1 rich control is calculated as $(\alpha 2 + \alpha 1)$. This is because the air-fuel ratio in the #1 cylinder that has the rich air-fuel ratio becomes closer to the rich side by the #1 rich control even during the stop of the temperature rise processing and because the variation degree is also the value that is obtained by the variation degree $\alpha 1$ by the #1 rich control being added to the variation degree $\alpha 2$.

In contrast, once the variation degree becomes α3 in the #2 rich control, for example, the variation degree α3 becomes a value less than (α2+α1) In this case, the air-fuel ratio of the #2 cylinder is controlled to be closer to the rich side than the air-fuel ratio during the stop of the temperature rise processing by the #2 rich control, but the air-fuel ratio of the #1 cylinder is controlled to be closer to the lean side than the air-fuel ratio during the stop of the temperature rise processing. In other words, this is because the difference between the air-fuel ratios of the #1 and #2 cylinders that respectively have the rich air-fuel ratio and the lean air-fuel ratio during the stop of the temperature rise processing decreases as a result of the execution of the temperature rise processing. The same applies to the variation degree in the #3 and #4 rich control.

The variation degree in the #1 rich control is calculated to exceed each variation degree in the #2 to #4 rich control in a case where the #1 cylinder is in an abnormal state and the air-fuel ratio of the #1 cylinder unintentionally becomes the rich air-fuel ratio even during the stop of the temperature rise processing as described above. Accordingly, in the present modification example, the abnormality determination processing is executed based on whether or not the variation degree (α2+α1) in the #1 rich control, which is the maximum value of the respective variation degrees in the #1 to #4 rich control, exceeds the determination value D2. As a result, an erroneous determination that the engine 20 is normal because each variation degree α3 in the #2 to #4 rich control is equal to or less than the determination value D2 can be avoided in a case where, for example, the ECU 50 should determine that the engine 20 is in the abnormal state with the #1 cylinder being in the abnormal state and the variation degree (α2+α1) exceeding the determination value D2 as described above.

The variation degree in the #2 rich control is calculated to exceed each variation degree in the #1, #3, and #4 rich control in a case where the #2 cylinder is in the abnormal state and the air-fuel ratio of the #2 cylinder becomes the rich air-fuel ratio even during the stop of the temperature rise processing. The variation degree in the #3 rich control is calculated to exceed each variation degree in the #1, #2, and #4 rich control in a case where the #3 cylinder is in the abnormal state and the air-fuel ratio of the #3 cylinder becomes the rich air-fuel ratio even during the stop of the temperature rise processing. The variation degree in the #4 rich control is calculated to exceed each variation degree in the #1 to #3 rich control in a case where the #4 cylinder is in the abnormal state and the air-fuel ratio of the #4 cylinder becomes the rich air-fuel ratio even during the stop of the temperature rise processing. Accordingly, the abnormality of any one of the #1 to #4 cylinders can be accurately determined, no matter which one of the #1 to #4 cylinders is in the abnormal state, by the abnormality determination processing being executed by the use of the maximum value among the respective variation degrees in the #1 to #4 rich control.

In the modification example described above, the abnormality determination processing is executed based on whether or not the maximum value among the respective variation degrees in the #1 to #4 rich control exceeds the determination value D2. However, the disclosure is not limited thereto. For example, the abnormality determination processing may also be executed based on whether or not the average value of the respective variation degrees in the #1 to #4 rich control exceeds a determination value D2'. The determination value D2' in this case is a value that exceeds the determination value D1.

In the modification example described above, the ECU 50 acquires the maximum value of the amount of change within a predetermined period in the detection value of the air-fuel ratio sensor 33 in one cycle over a predetermined cycle for each of the #1 to #4 rich control and uses the average value of the maximum values in the respective cycles described above as the variation degree in each of the #1 to #4 rich control. However, the disclosure is not limited thereto. For example, the total value of the maximum values may replace the average value of the maximum values. A value larger than in a case where the average value of the maximum values is used needs to be adopted as the determination value D2 in this case.

The v is not limited to the specific examples that have been described in detail above. The disclosure can be modified and altered in various ways within the scope of the disclosure described in the claims.

As described above, the rich air-fuel ratio and the lean air-fuel ratio are realized by the increase/decrease correction being performed with respect to the fuel injection amount realizing the target air-fuel ratio during the temperature rise processing. However, the disclosure is not limited thereto. In other words, the target air-fuel ratio of at least one of the cylinders may be set to the rich air-fuel ratio and the target air-fuel ratios of the other cylinders may directly be set to the lean air-fuel ratio during the temperature rise processing.

What is claimed is:

1. An abnormality diagnosis device for an internal combustion engine having a plurality of cylinders, the abnormality diagnosis device comprising
an electronic control unit configured to:
execute temperature rise processing in which a temperature of a catalyst controlling exhaust gas from the cylinders is raised by controlling an air-fuel ratio of at least one of the cylinders to be a rich air-fuel ratio lower than a stoichiometric air-fuel ratio and controlling an air-fuel ratio of each of the other cylinders to be a lean air-fuel ratio higher than the stoichiometric air-fuel ratio;
determine whether or not the execution of the temperature rise processing is ongoing;
execute abnormality determination processing to determine whether or not the internal combustion engine is in an abnormal state based on a variation degree of the air-fuel ratios of the cylinders;
execute the abnormality determination processing based on whether or not the variation degree during stop of the temperature rise processing exceeds a first determination value; and
execute the abnormality determination processing based on whether or not the variation degree during the execution of the temperature rise processing exceeds a second determination value, the second determination value being larger than the first determination value.

2. The abnormality diagnosis device according to claim 1, wherein:
the electronic control unit is configured to execute the temperature rise processing by switching a single cylinder controlled to have the rich air-fuel ratio sequentially by controlling one of the cylinders to have the rich air-fuel ratio and controlling the air-fuel ratio of each of the other cylinders to be the lean air-fuel ratio; and
the electronic control unit is configured to execute the abnormality determination processing by using any one of a maximum value among respective variation degrees of combinations of the cylinders respectively controlled to have the rich air-fuel ratio and the lean air-fuel ratio during the temperature rise processing, an average value of the respective variation degrees of the combinations, and a total value of the respective variation degrees of the combinations, as the variation degree during the execution of the temperature rise processing.

3. An abnormality diagnosis method for an internal combustion engine having a plurality of cylinders, the internal combustion engine being configured to be controlled by an electronic control unit, the abnormality diagnosis method comprising:

executing, by the electronic control unit, temperature rise processing in which a temperature of a catalyst controlling exhaust gas from the cylinders is raised by controlling an air-fuel ratio of at least one of the cylinders to be a rich air-fuel ratio lower than a stoichiometric air-fuel ratio and controlling an air-fuel ratio of each of the other cylinders to be a lean air-fuel ratio higher than the stoichiometric air-fuel ratio;

determining, by the electronic control unit, whether or not the execution of the temperature rise processing is ongoing;

executing, by the electronic control unit, abnormality determination processing to determine whether or not the internal combustion engine is in an abnormal state based on a variation degree of the air-fuel ratios of the cylinders;

executing, by the electronic control unit, the abnormality determination processing based on whether or not the variation degree during stop of the temperature rise processing exceeds a first determination value; and executing, by the electronic control unit, the abnormality determination processing based on whether or not the variation degree during the execution of the temperature rise processing exceeds a second determination value, the second determination value being larger than the first determination value.

* * * * *